(12) United States Patent
Kirk

(10) Patent No.: US 6,860,024 B2
(45) Date of Patent: Mar. 1, 2005

(54) QUOIN CORNER FORM USED IN BRICKLAYING

(75) Inventor: Cary Joseph Kirk, Monroe, NC (US)

(73) Assignee: Cary J. Kirk, Sr., Lewisburg, WV (US)

( * ) Notice: Subject to any disclaimer, the term of this patent is extended or adjusted under 35 U.S.C. 154(b) by 527 days.

(21) Appl. No.: 09/853,241

(22) Filed: May 10, 2001

(65) Prior Publication Data

US 2001/0039741 A1 Nov. 15, 2001

Related U.S. Application Data

(60) Provisional application No. 60/203,529, filed on May 11, 2000.

(51) Int. Cl.[7] .................. G01C 15/00; G01C 15/12; E04G 21/18
(52) U.S. Cl. .................. 33/405; 33/407; 249/15
(58) Field of Search .................. 33/404, 405, 406, 33/407, 408, 410; 249/15

(56) References Cited

U.S. PATENT DOCUMENTS

| | | | | |
|---|---|---|---|---|
| 2,728,142 A | * | 12/1955 | Betterton | 33/404 |
| 2,949,673 A | * | 8/1960 | Belcher | 33/406 |
| 3,348,312 A | * | 10/1967 | Jones | 33/406 |
| 4,080,739 A | * | 3/1978 | Ruhaak | 33/405 |
| 4,793,586 A | * | 12/1988 | Buss | 249/15 |
| 4,915,344 A | * | 4/1990 | Polak | 249/15 |
| 4,995,167 A | * | 2/1991 | Sanchez | 33/404 |
| 5,119,565 A | * | 6/1992 | Horvath et al. | 33/405 |
| 5,392,523 A | * | 2/1995 | Hurt | 33/408 |

OTHER PUBLICATIONS

Near, US Patent Application Publication No. US 2003/0079437, May 1, 2003, see entire document.*

* cited by examiner

Primary Examiner—G. Bradley Bennett

(57) ABSTRACT

A quoin tool and method for constructing a quoin corner and a regular corner on a structure. The quoin tool includes a two frames rotatably joined by a series of cross-members. Slots are defined between the cross-members to allow egress of mortar during bricklaying. Spaces are attached to the frame to provide along with the frame, a surface for arranging bricks in a protruding pattern. The frame removably attaches to the structure via a pair of braces and is supported by brackets attached to the bottom of the frame. The regular corner is of a similar configuration but without the spacers so that the brick are flush with an adjoining wall. Furthermore, the method includes use of a twig for quickly running and securing a leveling line to serve as a guide in laying courses of brick.

14 Claims, 4 Drawing Sheets

QUOIN CORNER FORM USED IN BRICKLAYING

CROSS REFERENCE TO RELATED APPLICATION

This application claims the benefit of U.S. Provisional Application No. 60/203,529, filed May 11, 2000

FIELD OF THE INVENTION

This invention relates to the art of brick laying, more particularly to the art of using a form in brick and still more particularly to the art of using a quoin-form in a brick laying to create a quoin corner and a regular corner-form for creating a regular corner on a structure.

BACKGROUND OF THE INVENTION

Brickwork for residential and commercial structures requires great craftsmanship and time on behalf of the bricklayer. Consequently, bricklaying is expensive. Aspects of bricklaying which require particular skill and time include: 1) The formation of regular corners, 2) The construction of quoin come and 3) laying level courses of brick during formation of a wall. These constructions are performed by hand, laborious, and particular attention is required to make the corner as close as possible to a true right angle. the level line from sagging between the corners, a support nail is often pounded into the structure between the corners. This process of running the leveling line positioning a nail to support the leveling line is repeated as the rows of bricks are constructed. Since the leveling line is used as a guide, it is very important that the string is level. However, repeated positioning of a nail to support the leveling line tends to be inaccurate and leads itself to human error.

Accordingly, what is needed are corner tool devices to respectively aid the bricklayer in the construction of a regular corner and quoin corner so that the corners can be constructed in a fraction of the time and without requiring exceptional skill. Further needed is a twig device for quickly and accurately positioning a leveling line in the construction of walls.

SUMMARY OF THE INVENTION

The present invention provides apparatus and methods for brick laying quoin corners, regular corners and maintaining a leveling line. The quoin corner tool includes two slotted frame members hingedly connected. Horizontal slots within the frame members are spaced a distance equal to the thickness of one layer of brick and its mortar bed joint, this distance being a modular standard of 2 $^{43}/_{64}$ inches apart vertically and run horizontally from the hinged edge of the frame member to the opposing edge of the frame member.

In use, the frame members are moved about the hinge to form a ninety-degree angle. The form is then spaced a distance equal to the width of the brick shelf with this distance being a modular standard of 4 inches not including any allowance for wall irregularity away from the corner of a structure and attached to the structure. The form is spaced away from the structure such that the brick may be placed between the wall of the structure and a frame member, with the outside surface of the brick containing the frame member when said brick protrudes from the main brick surface of the wall by three quarters of an inch to an inch. The slots within each frame member are proportional in height to the height of the brick being laid within the frame. As each layer of brick and mortar are placed between the structure surface and the frame member, with the top of the brick guiding it's position. Mortar is allowed to escape through the slots in the frame member immediately at the base of the brick. One the quoin corner has been laid and the mortar has had time to partiality cure, the invented form can be simply removed from the corner structure. Thus the invented tool allows consistent and efficient brick laying of a brick quoin corner with a consistent amount of protusion from the main brick surface, and with carefully controlled surface quality and angle measurement.

In the broadest sense, the present invention includes a first frame member attached to a second frame member. The first and second frame members are substantially rectangular and have planar inner and outer faces. The frame members also include a parallel proximal and distal member and cross members joining the proximal and distal members. The height of each cross member is $2^{43}/_{64}$ inches to match the height of one layer of brick and it's mortar bed in a standard modular system and defines a plurality of slots between the cross members. The slots each have a height greater than ½ inches so to allow mortar to therethrough pass when in use.

An object of the present invention is to include a first brace attached to the first frame and a second brace attached to the second frame. The first and second braces are capable of respectively holding the first and second members distance from a structure and capable of adjusting that distance this distance will be 4 inches plus or minus any wall irregularity.

Another object of the present invention is to include a distal bracket removably attachable to the bottom end of the first frame and distal bracket removably attachable to the distal end of the second frame. A removable center bracket is simultaneously attachable to the respective bottom ends of the first and second frames. The corner bracket is capable of holding the first and second frames in a ninety-degree angle relationship. The bracket rests upon the shelf that the brick are being laid upon A further objects of the present invention it to include a central hinge for rotatably joining the first and second frame members.

A still further object of the present invention is for each slot to have a height of $1^{12}/_{64}$ inches. Preferably, the height of each slot is in range of 1 inch to 1½ inches. More preferably, the height of each slot is $1^{12}/_{64}$ inches.

Another object for the present invention is include a first spacer removably attachable to the first frame member and a second spacer to the second frame member. The spacer has a proximal end, a distal end, and a first member joining said proximal end to a said distal end. The spacer will be ¾ inch thick standard for a ¾ inch quoin outset.

Still another object of the present invention is to provide a fist member having a height of $1^{31}/_{64}$ inches. All other cross members will have a height of $1^{31}/_{64}$ inches so that the height of each cross member and the slot immediately about or below it will equal $2^{43}/_{62}$ inches which equals the modular standard height of one brick layer with its bed joint of mortar.

BRIEF DESCRIPTION OF THE DRAWINGS

The foregoing and other objects will become more readily apparent by referring to the following detailed description and the appended drawings in which.

DETAILED DESCRIPTION

Figures 1, 2:
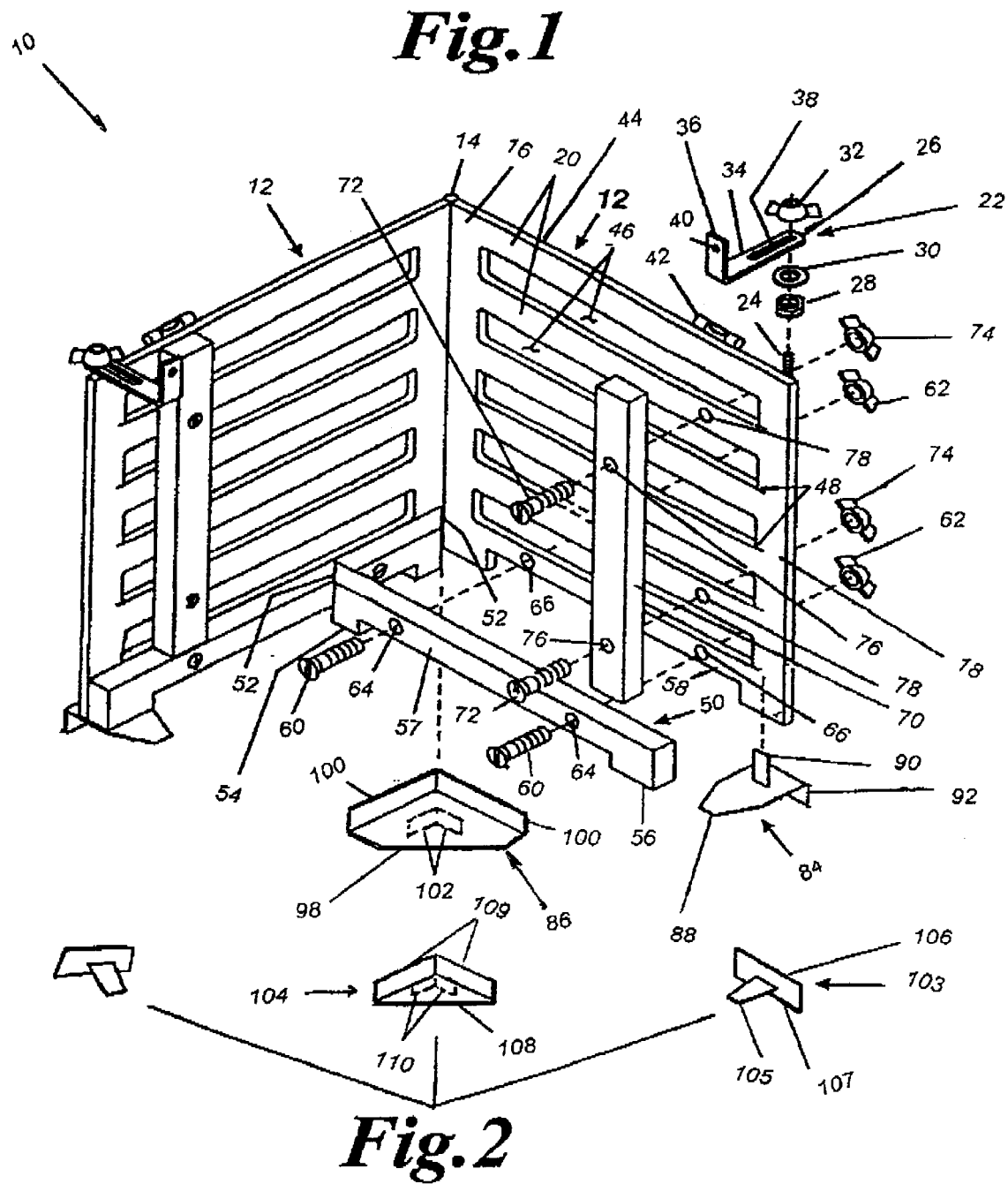
FIG. 1 shows an isometric view of the invented quoin corner tool having a single-brick spacer and starter brackets.
FIG. 2 shows an isometric view of continuation brackets.

FIG. 1 illustrates a quoin tool 10 for making a quoin corner on a structure such as a residential or commercial building. The quoin tool 10 includes two frames 12 rotatably joined by a central hinge 14. The frames 12, and components attached to the frames 12, are mirror images of each other. Consequently, the disclosure typically will be directed towards one frame 12, but applies equally to both frames.

The frame preferably is unitary, substantially rectangular in shape, and form of a sufficiently rigid, durable material such as metal or sturdy polymer material. The frame 12 includes parallel, proximal and distal, height-wise members 16, 18. The proximal member 16 is secured to the central hinge 14 and the distal members 18 forms an outer end of the frame 12. A series of parallel, horizontal cross-members 20 join the proximal and distal members 16, 18. The cross members 20 typically are the same size, elongate and extended, as measured from the central hinge 14, a distance greater than the horizontal width of the desired quoin corner. Typically this distance is sufficient to accommodate the length of 2 or 2½ standard bricks. Further more, the cross-members 20 have a height of 1³¹⁄₆₄ inches. (A standard brick is 8 to 8¼ inches wide, 2¼ to 2½ inches high, and 3¾ to 3⅞ inches deep). Preferable the height of the cross-members 20 is 1³¹⁄₆₄ inches. The vertical distance from the bottom of any cross member to the bottom of the cross members immediately above it is to be 2⁴³⁄₆₄ inches. This distance is the high of one brick plus its mortar bed.

An adjustable brace 22 is attached to the upper end of the distal member 18 for attaching the quoin tool 10 to a structure. The brace 22 includes a bolt 24 attached to, and extending upward from, the distal member 18; and elongate bracket 26 movable on the bolt 24; a spacer 28 and a washer 30 positioned on the bolt 24 to elevate bracket 26 above the distal member 18; and a wingnut 32 attached to the terminal end of the bolt 24 to removably secure bracket 26 in a position.

The elongate bracket 22 includes a main body 34 and an end portion 36 bent ninety degrees from the main body 34 to conform to a surface of a structure. The main body 34 has an elongate slot 38 which receives the bolt 24 and allows the quoin tool 10 to be positioned closer to, of further from, the structure. This distance is equal modular brick shelf plus any wall irregularity. The end portion 36 is provided with a hole 40 for receiving a screw which secures the quoin tool 10 to the structure.

A level 42 is positioned at the top edge of the upper most cross-member 44 to provide a means for ensuring the quoin tool 10 is level.

The cross-members 20 define a series of parallel horizontal slots 46 therebetween which terminate at the proximal and distal members 18, 18. The slots 46 are elongate and extend horizontally substantially the same distance as the cross-members 20. The height of each slot 46 is at least a ½ inch, preferably between 1 and 2 inches, more preferably between 1 and 1½ inches, and more preferably between 1½ and 1¾ inches. The combined height of the cross-members 20 and the slots 2⁴³⁄₆₄ inches are configured so that when in use each slot 46 corresponds to a mortar interface between courses of brick to allow egress of excess mortar from between the bricks. The cross-members 20 are positioned adjacent brick courses and form a planer inward facing surface against which the bricks are aligned A notch 48 is cut into the distal member at the outer terminal end of the slot. The notch 48 is sized and positioned to hold a leveling line at height suitable to serve as a guide.

To create a pattern of flush and protruding bricks, a width wise space is removably attached to the frame 12, such as the single-brick width wise spacer 50 shown in FIG. 1. The single-brick width wise spacer 50 includes proximal and distal downward extending leg sections 54, 56 which and a member 57 joining the leg sections 54, 56. The member 57 has a height equal to the combined height of a cross member and slot which is 2⁴³⁄₆₄ inches and is used to position the flush corners of bricks. Additionally, the width wise spacer 50 extends the width of the frame 12 with the proximal edge terminating in a 45 degree chamfer 52 such that when the chamfers 52 about one another the quoin 10 is positioned at a ninety degree angle.

The width wise spacer 50 is removably attached to the bottommost cross-member 58 of the frame 12 by any suitable manner such as the shown bolts 60 and wing-nuts 62. The width wise spacer 50 has holes 64 which align with holes 66 in the bottommost cross-members 58 to receive the bolts 68.

When in use, the insertion portion 90 is secured between the distal member 18 and the widthwise spacer 50. The leading edge of the main body 88 is placed atop the foundation to keep the quoin tool 10 from moving. The outer lip 92 abuts the corner of the foundation upon which the quoin tool 10 is to built and to hold the quoin tool 10 in place.

The center starter bracket 86 is similar to the distal starter bracket 84 and includes a main body 98, an insertion 100, and an of outer lip 102. The offset is the same amount as for the distal starter brackets 84. However, the center starter bracket 86 is configured to be operational along a ninety-degree angle. Accordingly, the outer lip 102 holds the quoin tool 10 at a right angle.

After the first segment is laid, the distal and center continuation brackets 103, 104 as illustrated in FIG. 2, replace the starter brackets to position and hold the quoin tool 10 in place 103 includes a main body 105, an upward extending insertion portion 106 and a download extending lip 107.

The center continuation bracket 104 is similar to the distal continuation bracket 103 and includes main body 108 an insertion portion 109, and a lip 110. However, the center continuation bracket 104 is configured to be operational along a ninety degree angle.

Figure 3:
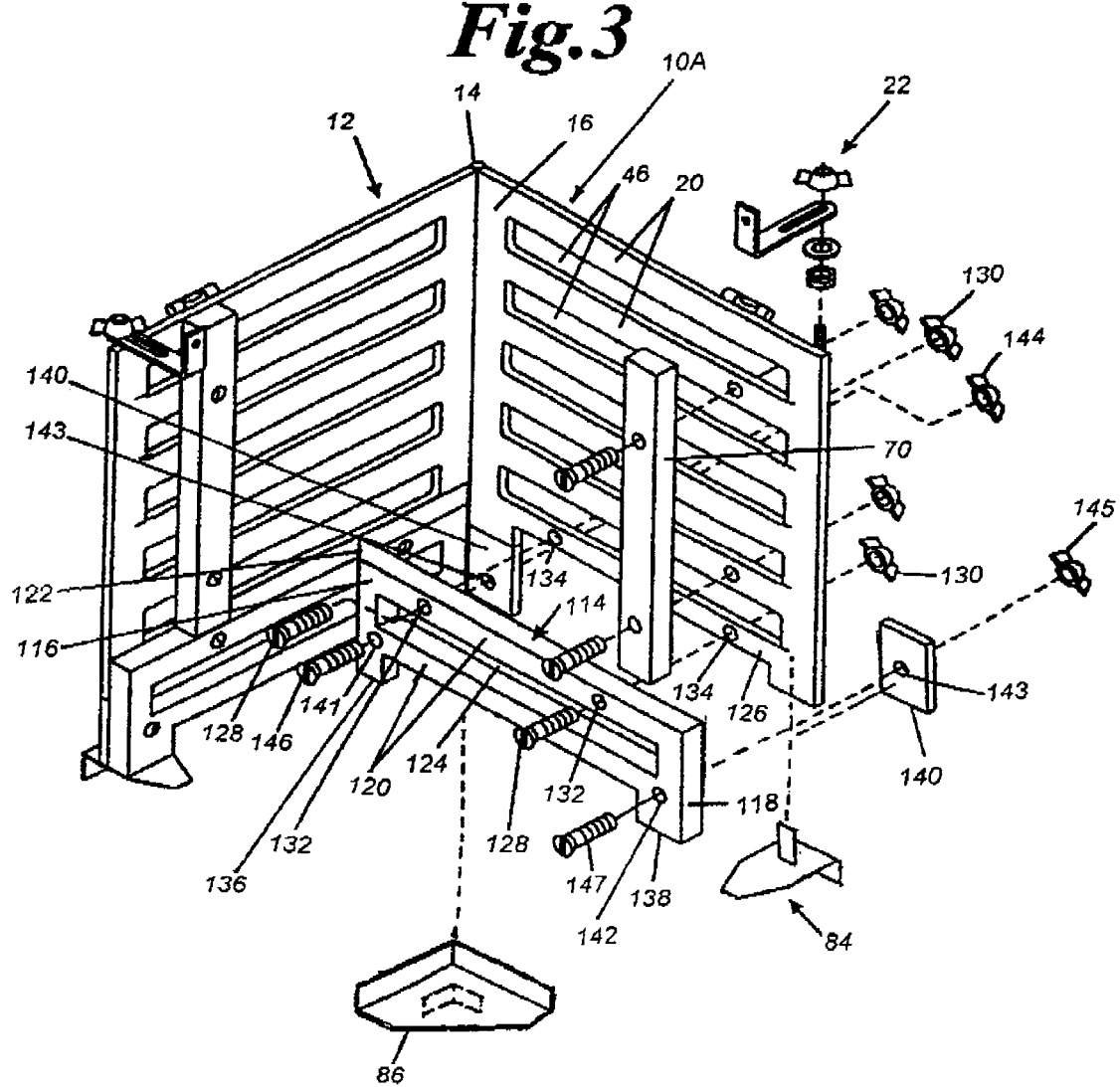
FIG. 3 shows and isometric view of the quoin corner tool having a double-brick spacer and starter brackets.

The continuation brackets 103, 104 are generally similar in configuration and operation as the starts brackets 84, 86, except that the insertion portion 106, 109 and the lip 107, 108 is properly positioned adjacent to the outer surface of the preceding course of brick so to maintain the quoin form 10 in proper position Alternative heightwise spacers can also be used to dictate any desired number of courses of brick. For example, FIG. 3 shows a quoin tool 10A configured the same as illustrated in FIG. 1, but having a double-brick widthwise spacer 50, but sized to flushly positioned two courses of brick The double-brick spacer 114 has a proximal member 116, a distal 118, and two parallel cross members 120 joining the proximal and distal members 116, 118. The proximal end of the double-brick spacer 114 terminates in a 45 degree chamfer 122 so that when the chamfers 122 abut one another the quoin tool 10 is positioned at ninety degrees. The cross-members 120 define a slot 124 therebetween. The cross-members 120 and the slot are configured in the same relationship as the cross-members 20 and slots 46 previously described in regards to FIG. 1. Accordingly, when in use, the cross-members 120 align adjacent to the front surface of the brick courses and the slot 124 aligns with the mortar between the courses.

The double brick spacer 114 is removably is removably attacked to the bottommost cross-member 126 of the frame 12 by any suitable manner such as the shown bolts 128 and wing-nuts 130. The member 126 to receive the bolts 128. The double-brick spacer 114 is also provided with downward extending proximal and distal legs 136, 138 to whish holding plates 140 are provided with holes 141,142,143 through which wing-nuts 144,145 and bolts 146,147 secure the plates 140 to the legs 136,138, the plates 140 and the legs 136, 13/8 and continuation brackets 103,104 described above and illustrated in FIGS. 1 and 2 are used with the double spacer quion form 10A.

Another alternative is to provide the quoin tool 10, 10A with spacers and center brackets for the construction of both inner and outer corners. In this alternative, the level deceive and the attachment means are positioned on the tip edge of the frame 12 sot to not interfere with bricklaying. In a further alternative the two frames 12 are fixedly secured together at ninety degrees.

Figure 4:
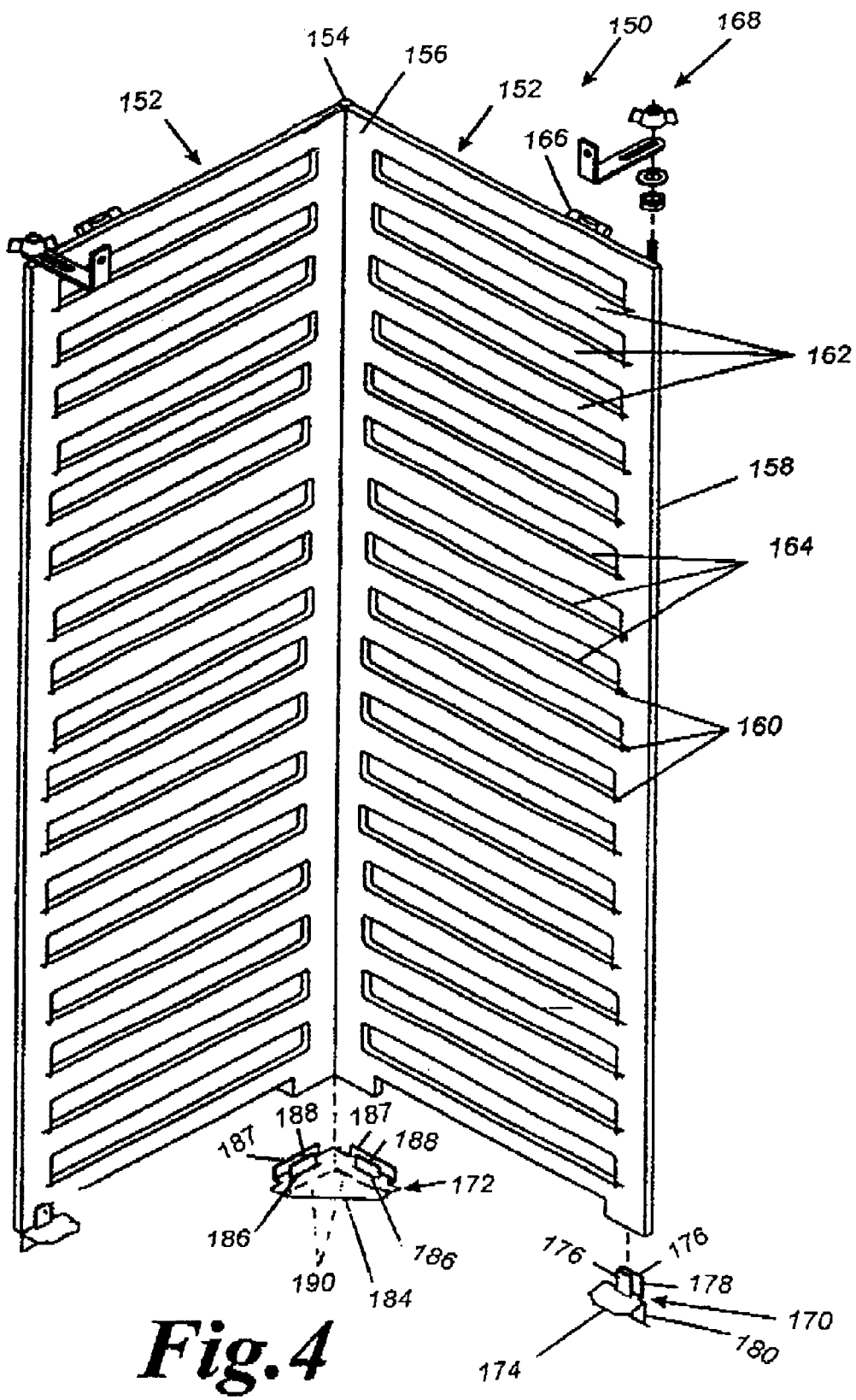
FIG. 4 shows an isometric view of a regular corner tool.
Figure 5:
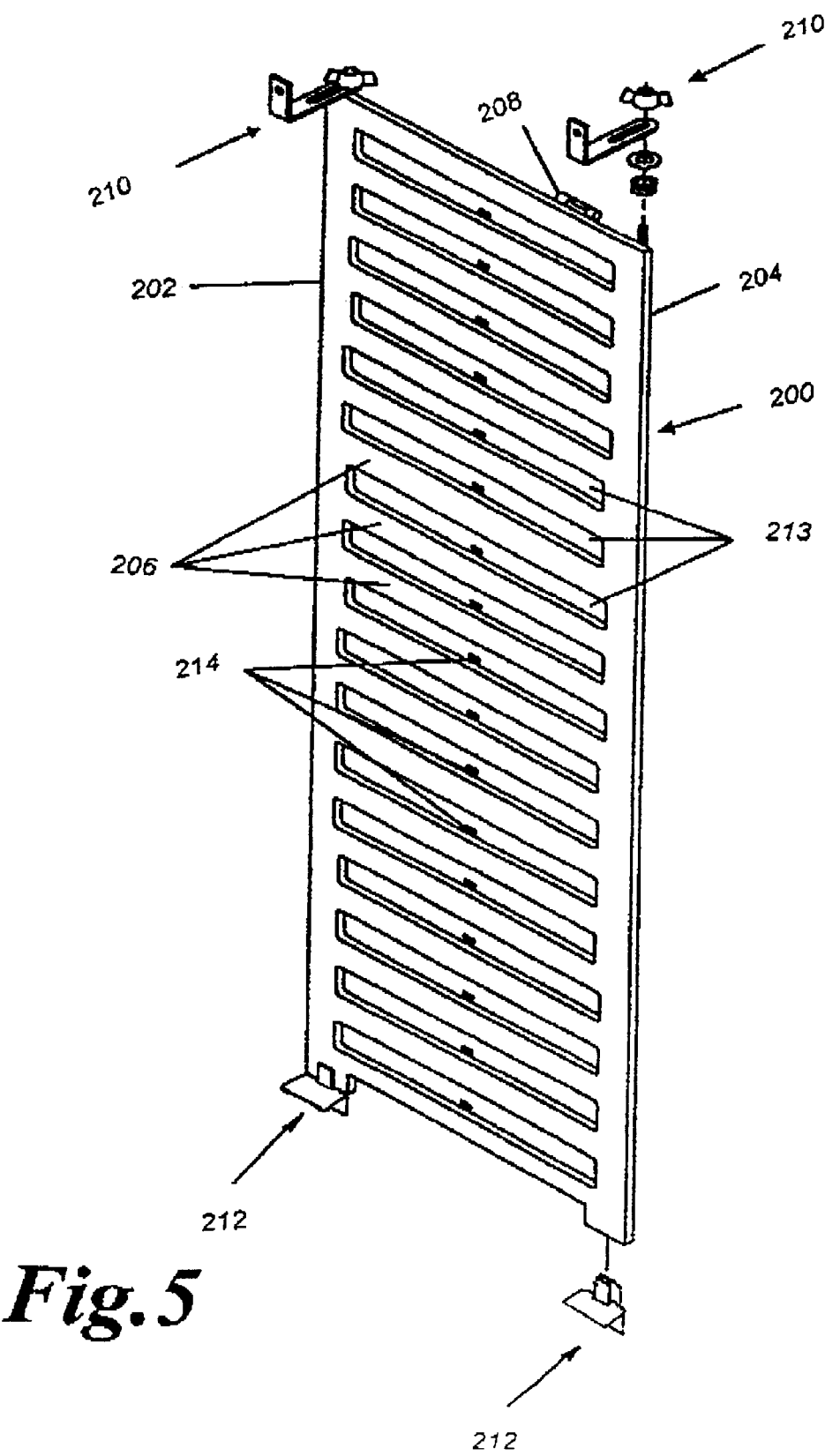
FIG. 5 shows an isometric view of a line-leveling twig.

FIG. 4 illustrates a regular corner tool 150 for making a both outer and inner regular corners on a structure. The illustrates regular corner form 150, shown in position to make an outer corner, includes two frames 152 rotatably joined by a central hinge 154. The frames 152, and components attached to the frames 152, are mirror images of each other. Consequently, the disclosure typically will be directed towards one frame 152, but applies equally to both frames 152.

The regular corner tool 150 is configured similar to the quoin tool 10 but without the spacers 50,70. That is, the corner tool 150 includes proximal and distal height-wise members 156,158 wherein the distal members 158 are provided with a notch 160 for attaching a leveling line; a series of parallel, horizontal cross-members 162 join the proximal and distal members 156,158; slots 164 are defined between the cross-members 162; a leveling device 166 is provided, and a brace 168 is provided for attaching the frame 12 to a structure.

The regular corner tool 150 uses different distal and center brackets 170, 172 than the quoin form 10. The distal and center brackets 170,172 are removably attachable to the lower end of the fame 152 in position. The distal bracket 170 includes horizontally extending plate 174 for insertion into the mortar between courses of brick and thereby supporting the regular tool 150; a pair of plates 176 extending ninety degrees upward from the horizontal plates 174 and defining a channel 178 therebetween for receiving the lower end of the frame 152; and a plate 180 extending ninety degrees downward from the horizontal plates 174 to align the regular form 150 flushly with the external surface of the corner.

The differences include that the twig 200 utilizes a second removably attachable distal bracket 212 instead a center bracket, and has two adjustment braces 210. Additionally, each cross-member 206 is provided with a means for attaching the level line by any suitable attachment device such as, for example, a hook, bob or boss. The level line attachment means 214 is preferably attached to the upper edge, at that midpoint, of the cross-members 206 and extends slightly into the slot 213.

In constructing a quoin corner, the desired widthwise spacer is selected depending on the pattern of protruding and flush bricks desired and the amount of protrusion. The quoin tool 10 is rotated until the beveled 45 degree chamfers 52 of the widthwise spacers 50 engage. The insertion portion 90 of the brackets 84, 86 are inserted and tighten between the widthwise spacer 50 and the frame 12. The central bracket 86 and the chamfers 52 maintain the quoin corner form 10 at 90 degrees. Proper distance between the structure and the invented form is determined and the quoin form 10 is securely positioned accordingly by use of the brackets 84, 86 and the adjustment brace 22.

Mortar and brick are then laid between the frame wall and the quoin tool 10 with the initial layer of brick resting on the main body starter brackets 84, 86. The slots 46 in the frame 12 align with succeeding mortar joints from the foundation up. Succeeding courses of brick are placed abutting the widthwise spacer 50 and the cross-members 20 to form a consistent quoin corner. Since the cross-members 20 are spaced further from the structure than the widthwise spacer 50, the bricks abutting the cross-members 20 will protrude from the corner. As the brick and mortar are laid within the quoin tool 10, excess mortar escapes through the slots 46.

To construct a second segment of the brick pattern, the quoin tool 10 is easily removed by unattaching the brace from the structure and removing the starter brackets 84, 86 from the semi hardened mortar. Thereafter, continuation brackets 94, 96 are attached and used to position the quoin from 10 atop the newly constructed first segment of the quoin corner. The adjustable brace 22 is then attached to the structure to secure the quoin tool 10. Brick and mortar are laid, in the same manner as the initial process, on top the first quoin corner segment. This process is repeated until a desired height is reached.

The regular corner tool 150 is used to construct a standard brick corner. That is, a corner in which all of the bricks are flush with a respective wall. The regular corner from 150 is used essentially the same as the quoin corner tool 10 except the regular form 150 uses the same brackets 170, 172 for both starter and continuation brackets, and there are no spacers. The twig 200 is used in conjunction with either the quoin or regular corner tool 10, 150. The twig 200 is positioned between the corner forms 10, 150; spaced a distance from the structure wall so that brick can be laid between the twig 200 and the structure wall; and attached to the structure bay use of the adjustable braces 210. A leveling line is ran between the corner forms 10, 150 and the twig 200 to serve as a guide for laying a level course of brick. The leveling line is releasable positioned in the notches 48, 160 of the corner tools 10, 150 and the line attachment means 214 are equitant spaced, the level line can be quickly be removed from a row and accurately positioned on a subsequent row.

The preferred height of the quoin corner tool 10 is oriented to one course of flush bricks followed by five courses of protruding bricks. Another preferred arrangement calls for a quoin tool 10A capable of retaining of retaining two courses of flush bricks followed by five courses protruding bricks. However the present invention is not restricted by these preferred arrangements and other configuration are also acceptable. For example, the height of the quoin tool can be adjusted to accommodate more or less protruding or flush bricks. As another example, multiple widthwise spacers can be used to vary a pattern bricks. As a further example, although preferred that the quoin and regular corner tool be separate devices, the quoin tool can be used to make regular corner by removing the spacers.

SUMMARY OF THE ACHIEVMENT OF THE OBJECTS OF THE INVENTION

From the foregoing, it is readily apparent that I have invented an improve apparatus and method for efficient construction of brick quoin corners upon structure It is further apparent that I have invented a improved apparatus and method for quickly running and securing a leveling line to serve as a guide in laying courses of brick.

It is to be understood that the foregoing description and specific embodiments are merely illustrative if the best mode of the invention and the principles thereof, and that various modifications and additions may be made to the apparatus by those skilled in the art, without departing from the spirit and scope of this invention, which is understood to be limited only by the scope of the appended claims.

I claim:

1. A corner tool for guiding the; laying of the brick only during laying of a brick quoin corner upon a structure a tool comprising:
   a first frame member,
   a second frame member directly or indirectly attached to said first frame member, wherein each of said first and second frame members are substantially rectangular having a horizontal measurement of 20 inches and a vertical measurement of 16 inches which equals six courses of brick with their bed joints modular vertically and have substantially planer inner outer faces, and wherein each of said first and second frame members are comprised of a proximal member and a distal member in parallel relationship, a series of parallel cross-members joining said proximal member to said distal member wherein each of said cross members has a height of 1 31/64 inches and defining plurality of parallel slots between said cross-members wherein each of said slots has a height of 1 12/64 inches whereby slots are capable for allowing mortar to pass therethrough, the height of each cross-member and the slot immediately above or below it must equal the height of one brick course and its bed joint, this height will be 2 43/64 inches in a modular system.

2. The tool according to claim 1 further comprising a first brace attached to said first frame member and a second brace attached to said second frame member, wherein said first and second braces are capable of respectively spacing said first and second frame members an adjustable distance from the structure and are capable of being attached to the structure, this distance will be equal to the width of the brick shelf modularly standard at 4 inches plus or minus any wall irregularity nominally not exceeding ½ inch.

3. The tool according to claim 2 further comprising:
   a first distal bracket removably attached to a first bottom end of said first frame,
   a second distal bracket attachable to a second bottom end of said second frame, and
   a center bracket removably attachable simultaneously to both said first and second bottom ends and capable of holding said first and second frames at about a ninety degrees angle, said brackets for resting upon the outer edge of the 4 inch modular brick shelf.

4. The tool according to claim 2 further comprising a central hinge rotatably joining said first and second frame members.

5. The tool accordingly to claim 2 where said first and second frame members are fixed at a ninety degree angle in a relation to each other, when installed at a corner that is square.

6. The tool according to claim 4 further comprising a first spacer removably attachable to said first frame member and second spacer attachable to said second frame member, said spacers will have a thickness equal to a standard ¾ inch quoin outset from the flush surface from the brick wall.

7. The tool according to claim 6 wherein each of said first and second spacers include a proximal end and a distal end, and a first spacer member joining the proximal and distal ends.

8. The tool according to claim 7 wherein each of said first and second spacers further include a second spacer member joining said proximal and said distal ends.

9. The tool according to claim 8 wherein said first and second spacer members each have a height less than 2¼ inches and define a spacer slot between said first and second spacer members.

10. The tool according to claim 9 wherein said spacer slot has a height of 1 12/64 inches.

11. The tool according to claim 9 wherein said spacer slot has the same height as said slots and each of said first and said second spacer members have the same height as said cross members.

12. The tool according to claim 9 further comprising a first heightwise spacer attachable to said first frame at a distance at least sixteen inches from a proximal edge of said proximal end.

13. The tool according to claim 12 wherein said first and second distal ends include a plurality of equally of equally spaced attachment means for releasable holding a leveling line.

14. The tool according to claim 13 wherein said attachment means is a notch.

* * * * *